United States Patent Office 3,258,219
Patented June 28, 1966

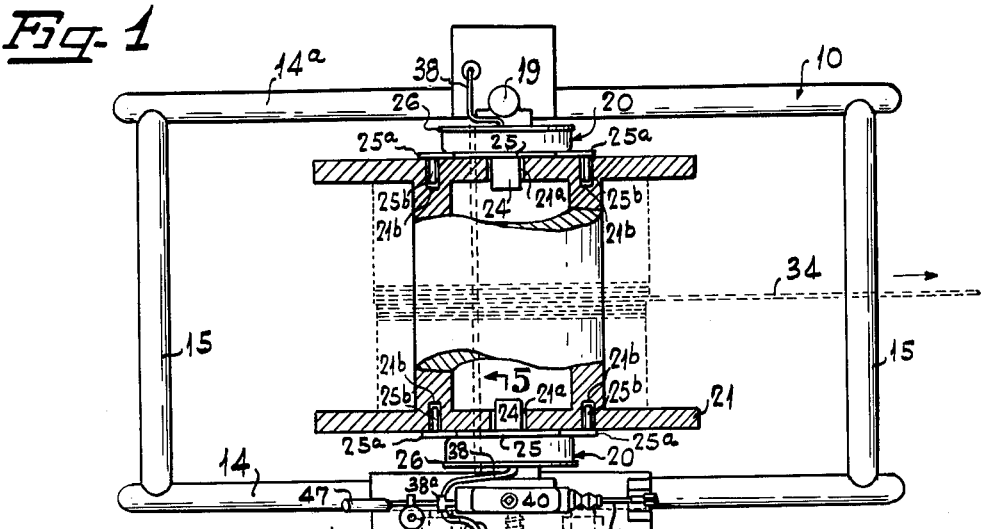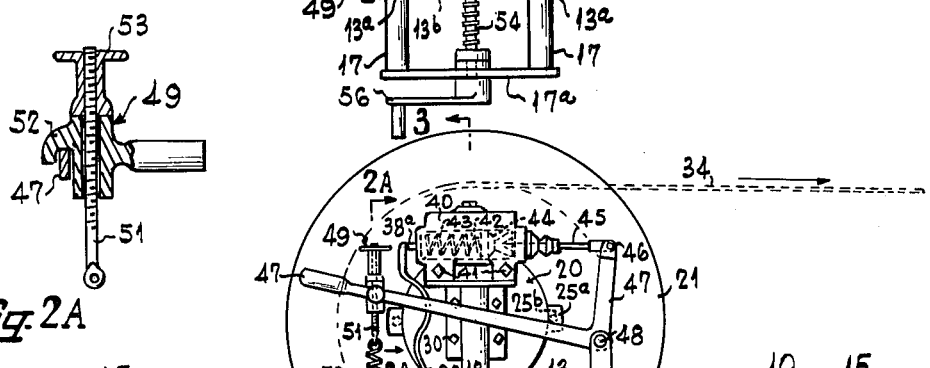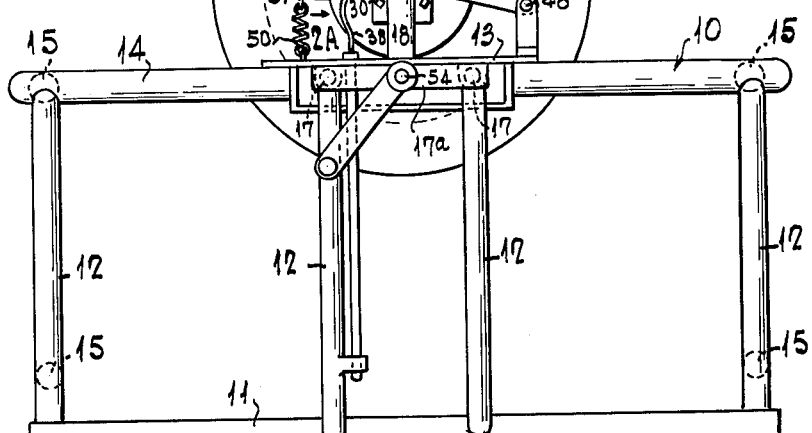

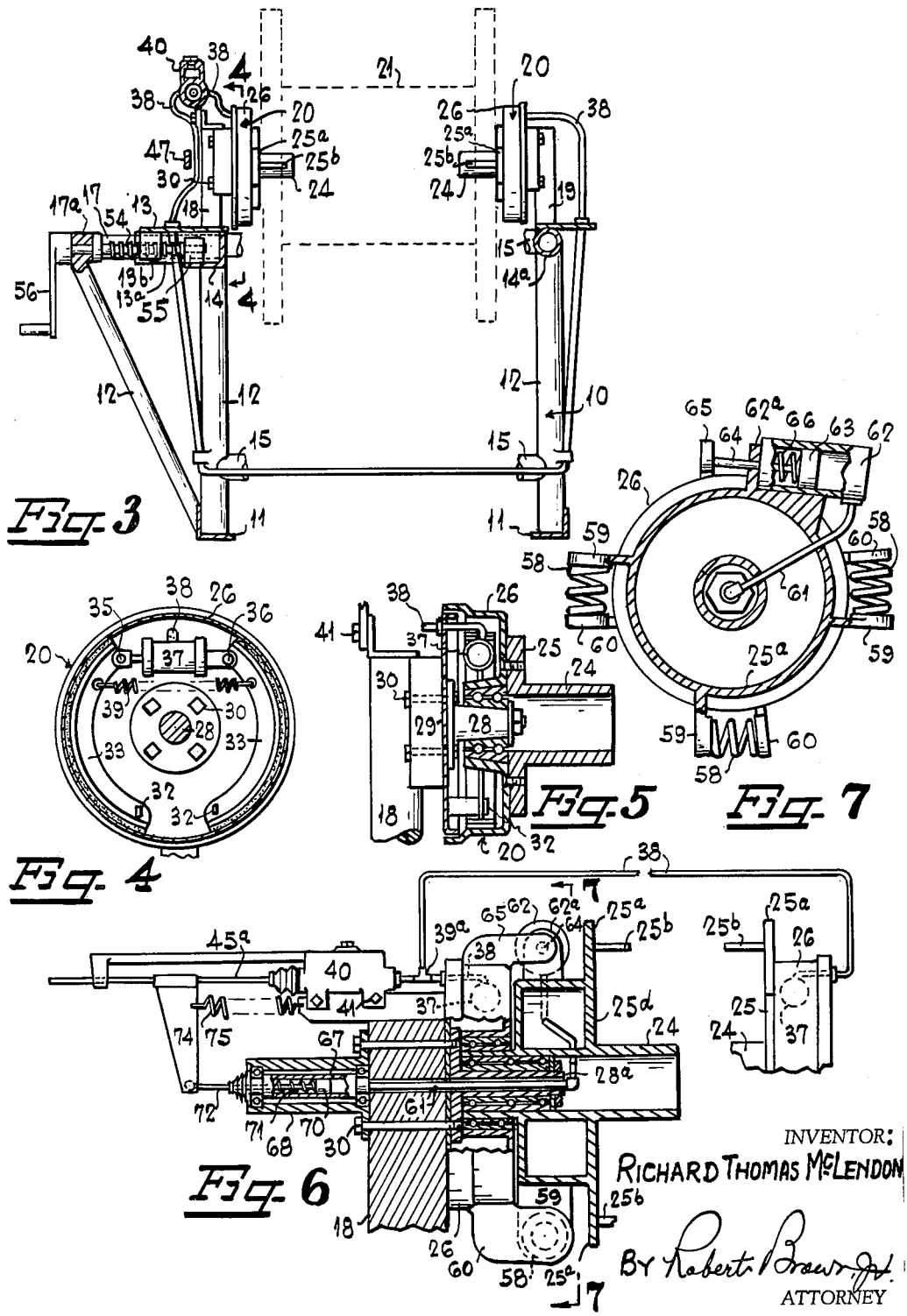

3,258,219
TENSION PAY-OFF MECHANISM FOR CABLE REELS
Richard Thomas McLendon, 110 Kickapoo St., Jacksonville, Tex.
Filed Oct. 28, 1963, Ser. No. 319,257
2 Claims. (Cl. 242—86.7)

This invention relates to let-off mechanism for packaged strand material and more especially to means for controlling the tension of a cable as it is unwound from a reel.

The present invention is particularly useful in controlling the tensile stress in a power line while it is pulled over or adjacent existing high voltage lines still in service. Under such conditions, a control of the cable tension within relatively narrow limits is mandatory in order to safeguard the lives of the workmen. Either an excess or an insufficient cable tension during installation greatly increases the liklihood of contact with the adjacent electrically charged service lines and consequently the danger of bodily injury.

Effective control of cable let-off or pay-out tension is largely dependent upon the degree of uniformity of internal stresses throughout the reel as a result of the cable pull and the concurrent opposing braking action restraining reel rotation. The application of braking forces at only one end of the reel, or the application of substantially unequal braking forces at opposite ends of the reel, will produce torque and bending stresses throughout the reel length thereby deflecting the axis of rotation and introducing widely variable operating frictional forces adversely affecting safe and efficient cable stringing.

It is therefore an object of this invention to provide a cable reel let-off mechanism devoid of the aforementioned disadvantages.

It is a further object of invention to provide a let-off mechanism of the class described having equalized braking action effective at opposite ends of the cable reel whereby internal reel stresses and torque will be reduced substantially throughout the reel length.

It is another object of invention to provide a cable reel let-off mechanism equipped with braking means directly and automatically proportional to the cable tension to thereby maintain a uniform tension for all diameters of the wound cable on the reel. Heretofore, it has been proposed to employ cable reel braking means automatically responsive to the combined weight of the cable and reel for controlling the cable tension, as set forth in Patent No. 2,780,419, issued February 5, 1957. Since a number of factors, other than weight, produce widely varying cable stresses, such prior devices afford at most a partial solution to the problem solved by the present invention.

It is a further object of invention to provide an automatic tension control for cable reels, as well as similarly constructed manually operated controls, characterized by simplicity of construction, relatively inexpensive manufacturing cost, and high efficiency in operation.

Some of the objects of invention having been stated other objects will appear as the description proceeds when taken in connection with the accompanying drawings, in which:

FIGURE 1 is a plan view of my improved pay-out or let-off cable reel mechanism with portions thereof shown in section;

FIGURE 2 is an elevation of the reel mechanism, looking at the near side of FIGURE 1;

FIGURE 2A is a sectional detail view taken along line 2A—2A in FIGURE 2;

FIGURE 3 is a transverse sectional view taken along line 3—3 in FIGURE 2;

FIGURE 4 is an enlarged sectional view taken along line 4—4 in FIGURE 3, showing portions of the combined brake and chuck unit which supports one end of the reel;

FIGURE 5 is an enlarged vertical sectional view taken along line 5—5 of FIGURE 1 and showing further details of the combined brake and chuck unit;

FIGURE 6 is a sectional detail view, partly schematic, showing a modified form of the invention in which the braking action is applied equally at opposite ends of the reel, said braking action being automatically varied in accordance with the tension in the unwound cable length and the resulting stress produced thereby in the reel, and FIGURE 7 is a sectional view taken along line 7—7 in FIGURE 6.

Referring more particularly to the drawings, the numeral 10 broadly designates a framework for supporting my improved reel mechanism, said mechanism comprising horizontal bottom chords 11, upright web supports 12, horizontal top chords 14 and 14a, and horizontal transverse struts 15. Although no means has been shown for supporting the framework 10 and the reel mechanism associated therewith, it is evident that the desired portability may be provided by employing wheels as shown in the above-mentioned prior patent, or by mounting it upon the bed of a conventional motor truck.

A platform 13 is mounted for horizontal sliding movement above and transversely of top chord 14. Suitable lugs or collars 13a integral with the underside of the platform are slidably supported by parallel horizontal guide rods 17, 17 of framework 10, the outer ends of rods 17 being connected by a transverse bearing bar 17a and the inner ends by the top chord 14.

Extending upwardly from platform 13 and from top chord 14a are posts 18 and 19 respectively, each of said posts supporting a brake-controlled chuck unit 20. The units 20, 20 are removably supported therebetween a cable reel, mandrel or core 21 and also control the cable tension as it is unwound therefrom.

Each end of reel 21 is supported by a hub 24 of chuck unit 20, said hub removably fitting in bore 21a concentric with the axis of reel rotation. Hub 24 has a flange 25 integral therewith and secured to the vertical face or end wall of cylindrical brake drum 26. It will be observed in FIGURE 1 that flange 25 is provided with radially projecting extensions 25a, each having a flat face adapted to rest against the end of a supported reel 21. In order to prevent relative rotation between reel 21 and the aforementioned members 25, 25a and 26, suitable pins 25b project from extensions 25a and into eccentrically disposed holes 21b in the reel end. The pins 25b and holes 21a are disposed parallel to the axes of rotation of the hub 24 and of the supported reel whereby the latter may be installed in or removed from operative position by varying the axial distance between chuck units 20 as hereinafter described.

Brake drum 26 and the attached members 24 and 25 are rotatably mounted upon a stub axle 28 projecting horizontally from a stationary backing plate 29. Plate 29 serves as a cover for the end of cylindrical drum opposite the previously mentioned flange 25, and further serves as a support for the hereinafter described expanding and contracting brake element disposed within the drum. The backing plates 29, 29 are secured to the proximate faces of posts 18 and 19 respectively by means of bolts 30, said bolts also securing the aforementioned axles 28 in horizontally alined positions.

Pivotally secured to backing plate 29 as at 32, 32 are arcuate brake shoes 33, 33 which are adapted to frictionally engage the inner periphery of brake drum 26 to thereby effect a braking action in opposition to the tension of helically wound cable 34 as it is unwound from reel 21. The upper free ends of shoes 33, 33 are pivotally connected as at 35 and 36 respectively to the opposite ends of a conventional hydraulic drum cylinder 37. Tension spring 39 also connects the upper free ends of shoes 33, 33 to retract the latter from braking position in absence of expansive force from cylinder 37.

Brake fluid is supplied to each of the drum cylinders 37 by means of a flexible conduit 38, said conduit being connected as at 38a to a master cylinder 40 mounted as at 41 upon post 18. Cylinder 40 is of conventional construction, it being provided with fluid chamber 42, spring 43, piston 44 and piston actuating rod 45 which extends from the piston to the exterior of the master cylinder housing. The outer end of rod 45 is pivotally secured as at 46 to bellcrank lever 47 which in turn is pivotally mounted as at 48 upon platform 13. Bellcrank lever 47 is employed as a means for manually controlling the braking action exerted by units 20 upon the unwinding reel 21. By pressing the left-hand end of lever 47 downwardly in FIGURE 2, fluid will be expelled from chamber 42 and caused to move through conduit 38 into drum cylinders 37 and thereby expand the brake shoes 33, 33 into engagement with brake drums 26, 26. The pressure in conduit being uniform, it is evident that identical braking action will be applied to each unit 20 and at opposite ends of the reel so as to substantially reduce the unit torsional stresses within the reel. Torsional reel stresses which are braked or resisted at only one end of the reel subject that portion of the reel between the braked end and the point of emanation of the cable to substantially greater internal unit stresses, whereas, the latter stresses will be greatly reduced when the torsional reel stresses are shared by braking means at each end of the reel. Stated differently, the internal torsional reel stresses between the point of cable emanation and the respective reel ends are pitched in only one direction where the braking means is provided at only one end of the reel; but by providing a braking means at each reel end, the torsional reel stresses will be reversely pitched between the point of cable emanation and the respective reel ends to produce a positive torsional moment in one reel end and a negative torsional moment in the other.

It will be further observed that when the reel is braked only at one end, the tension in the emanating cable tends the entire pay-off mechanism to bodily rotate horizontally about the braked end, and the lever arm accompanying this tension will equal the distance from the point of cable emanation to the braked end. Obviously, the length of the lever arm will vary as the point of emanation traverses longitudinally of the reel during unwinding of the helically wound cable. With the reel equally braked, at opposite ends, however, the reaction to the cable tension will be divided as between the reel ends to thereby reduce said tendency to bodily rotate.

If desired, substantially constant tension may be applied to lever 47 by means of a hold-down unit 49 (FIGURES 1, 2 and 2A) which comprises tension spring 50, threaded rod 51, hook bracket 52, and handwheel 53, the latter member being threadably secured upon the upper end of rod 51. By turning handwheel 53 the tension transmitted by spring 50 upon lever 47 may be varied in accordance with requirements.

In order to install or to remove reel 21, means are provided for horizontally adjusting the position of platform 13 and the chuck unit 20 supported thereby to vary the spread between the two units 20. This adjustment means comprises a boss 13b integral with the underside of platform 13, a screw shaft 54 threadably mounted in said boss, and bearings 17a and 55 rotatably supporting the shaft 54 (FIGURE 3). A crank 56 is secured to the outer end of shaft 54 whereby the latter may be manually rotated to vary said spread between the chuck units.

FIGURES 6 and 7 illustrate a modified embodiment of the invention in which is provided a mechanism responsive to the cable tension for automatically maintaining a substantially equalized braking action proportional to said tension at opposite ends of the reel. In this embodiment, the parts corresponding to previously described parts of the preceding embodiment will be indicated by the same reference numerals without further detailed description.

The modified embodiment is provided with specific means for permitting relative rotation between hub flange 25d and brake drum 26 proportional to the reel torque produced by the cable tension, said means comprising one or more torque resisting springs 58 interposed between and absorbing the stress between the flange and drum. It will be noted that flange 25d is similar to the previously described flange 25 of the first embodiment, differing from the latter in that it is independently rotatable within narrow limits relative to drum 26.

Members 25d and 26 are rotatably mounted upon stationary axle 28a secured to post 18, said axle and post having an axial bore extending therethrough for accommodating a rotatable conduit 61. One end of conduit 61 extends radially of axle 28a and communicates with hydraulic cylinder 62 secured as at 62a to the periphery of flange unit 25d. Cylinder 62 has a piston 63 slidably mounted therein and an operating rod 64 connected to the piston and extending to the exterior of the cylinder. The outer end of rod 64 abuts a lug 65 integral with the outer periphery of the adjacent brake drum 26. Cylinder 62 is provided with conventional return spring 66.

The other end of conduit 61 communicates with another hydraulic cylinder 67 rotatably mounted in bracket 68 by means of bearings 69. Likewise, the cylinder 67 has piston 70 and return spring 71 therein, as well as operating rod 72 extending from piston 70, through the cylinder end remote from conduit 61.

Secured to the outer end of rod 72 by any suitable means such as a ball and socket is an upwardly extending arm 74, the upper end of which is rigidly secured to an intermediate portion of an operating rod 45a of master cylinder 40. A tension spring 75 normally urges rod 45a to the right in FIGURE 6 to cause fluid in cylinder 40 to flow into brake drum cylinders 37 as previously described. The actuating tension of spring 75 is resisted and controlled by the flow of fluid between the cylinders 62 and 67. These opposing forces are preferably balanced for an average cable tension.

It will be observed that as cable 34 is unwound from reel 21, the hub unit 25d will be rotated in a counterclockwise manner in FIGURE 7. An increase in the average cable tension will compress springs 58 which, in turn, will effect a limited relative rotary movement between unit 25d and brake drum 26 thus retracting rod 64 and piston 63 into cylinder 62 a distance equal to said relative rotation, thereby causing fluid to flow from cylinder 62, through conduit 61, and into cylinder 67. The cylinder 67 will then actuate master cylinder 40 through members 72, 74 and 45a to diminish braking action of drum cylinders 37 upon brake drums 26 as previously described. Conversely, a reduction of the average cable tension will permit spring 75 to actuate master cylinder 40 and increase the braking action accordingly. Thus a predetermined average cable let-off tension can be automatically maintained independently of the weight and diameter of the cable on the reel, while the two equalized braking means at opposite ends of the reel share in the total reel torque. Thus the unit torque stress in the reel will be substantially reduced.

In the drawings and specification preferred embodiments of the invention have been shown, and although specific terms are employed they are used in a generic sense and not for purposes of limitation, the scope of the invention being set forth in the following claims.

I claim:

1. In a let-off mechanism for a reel having a helically wound cable emanating therefrom, the combination of: a reel, a pair of spaced vertically disposed supports; a pair of spaced alined stub axles projecting horizontally from said supports, said axles rotatably supporting therebetween the opposite ends of said reel; a pair of disks fixedly mounted on said axles; interlocking means for preventing relative rotation between each of said disks and the adjacent reel end; braking means on each of said supports for restraining rotation of said reel, said last-named means including a brake drum, a set of radially expansible brake shoes engageable with the inner periphery of said drum, and a conduit interconnecting said drums; means including a hydraulic cylinder connected to said conduit for simultaneously effecting equalized braking action between said shoes and the respective drums to produce reversely pitched torsional reel stresses between the point of cable emanation and the respective reel ends, and means operable alternately with said last-named means for simultaneously releasing said braking action.

2. In a let-off mechanism for a reel having a helically wound cable emanating therefrom, the combination of: a reel, a framework rotatably supporting said reel, braking means at each end of said reel for restraining rotation of the latter, a conduit interconnecting said braking means, and means movable in one direction and including a hydraulic cylinder connected to said conduit for simultaneously effecting equalized braking action by said braking means to produce reversely pitched torsional reel stresses between the point of cable emanation and the respective reel ends, said last-named means being movable in the opposite direction to simultaneously release said braking action.

References Cited by the Examiner

UNITED STATES PATENTS

| | | | |
|---|---|---|---|
| 1,788,564 | 1/1931 | Daniel | 242—75 X |
| 2,235,412 | 3/1941 | Weiss | 188—181 |
| 2,241,191 | 5/1941 | Freeman | 188—181 X |
| 2,472,548 | 6/1949 | Schnell | 242—75.43 |
| 2,813,601 | 11/1957 | Bourgues | 242—75.53 X |
| 2,922,594 | 1/1960 | Pawlowski | 242—75.53 |
| 2,999,567 | 9/1961 | Adams | 181—181 |
| 3,019,995 | 2/1962 | Eckert | 242—86.7 X |
| 3,113,739 | 12/1963 | Elder | 242—86.7 |

FOREIGN PATENTS

| | | |
|---|---|---|
| 573,005 | 3/1959 | Canada. |
| 536,579 | 5/1941 | Great Britain. |
| 688,042 | 2/1953 | Great Britain. |

JORDAN FRANKLIN, *Primary Examiner.*

M. J. COLITZ, J. R. BOLER, *Assistant Examiners.*